(12) United States Patent
Wakabayashi et al.

(10) Patent No.: US 9,451,189 B2
(45) Date of Patent: Sep. 20, 2016

(54) SOLID-STATE IMAGE SENSOR AND CAMERA SYSTEM

(71) Applicant: Sony Corporation, Tokyo (JP)

(72) Inventors: Hayato Wakabayashi, Tokyo (JP); Yosuke Ueno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/348,727

(22) PCT Filed: Oct. 11, 2012

(86) PCT No.: PCT/JP2012/076351
§ 371 (c)(1),
(2) Date: Mar. 31, 2014

(87) PCT Pub. No.: WO2013/058167
PCT Pub. Date: Apr. 25, 2013

(65) Prior Publication Data
US 2014/0293103 A1    Oct. 2, 2014

(30) Foreign Application Priority Data
Oct. 20, 2011    (JP) .................................. 2011-230676

(51) Int. Cl.
*H04N 3/14*    (2006.01)
*H04N 5/335*    (2011.01)
(Continued)

(52) U.S. Cl.
CPC ............. *H04N 5/369* (2013.01); *H04N 5/3575* (2013.01); *H04N 5/374* (2013.01); *H04N 5/378* (2013.01); *H04N 5/3745* (2013.01)

(58) Field of Classification Search
CPC .... H04N 5/369; H04N 5/3745; H04N 5/378; H04N 5/3575; H04N 5/374; H04N 5/335; H04N 5/3355

USPC ...... 348/222.1, 332, 283, 241, 243; 341/155
IPC .......................................... H04N 5/335,5/3355
See application file for complete search history.

(56) References Cited

U.S. PATENT DOCUMENTS

| 2004/0008270 A1* | 1/2004 | Hisamatsu ............. H04N 5/185 348/257 |
| 2004/0080629 A1* | 4/2004 | Sato et al. ................. 348/222.1 |

(Continued)

FOREIGN PATENT DOCUMENTS

| EP | 1 115 244 A2 | 7/2001 |
| JP | 2002-158550 | 5/2002 |

(Continued)

OTHER PUBLICATIONS

International Search Report; International Application No. PCT/JP2012/076351; Filing Date: Oct. 11, 2012. (Form PCT/ISA/210).

(Continued)

*Primary Examiner* — Yogesh Aggarwal
(74) *Attorney, Agent, or Firm* — Michael Best & Friedrich LLP

(57) ABSTRACT

There is provided a solid-state image sensor including a pixel array unit in which pixels are arrayed, the pixel including a photodiode converting an optical signal into an electrical signal, and a readout unit which reads out an analog image signal from the pixel to a signal line and processes the read out analog pixel signal in a unit of column. The readout unit includes a ΔΣ modulator which has a function to convert the analog pixel signal in to a digital signal, and an amplifier which is arranged on an input side of the ΔΣ modulator and amplifies the analog pixel signal read out to the signal line using a set gain to input the signal to the ΔΣ modulator.

18 Claims, 11 Drawing Sheets

(51) Int. Cl.
    *H04N 5/369*      (2011.01)
    *H04N 5/374*      (2011.01)
    *H04N 5/357*      (2011.01)
    *H04N 5/378*      (2011.01)
    *H04N 5/3745*     (2011.01)

(56) References Cited

U.S. PATENT DOCUMENTS

| | | |
|---|---|---|
| 2009/0190018 A1 | 7/2009 | Sakakibara |
| 2010/0208114 A1 | 8/2010 | Kwon et al. |
| 2011/0050473 A1* | 3/2011 | Jung .................... H03M 3/356 341/143 |

FOREIGN PATENT DOCUMENTS

| | | |
|---|---|---|
| JP | 2004-112077 | 4/2004 |
| JP | 2005-323331 | 11/2005 |
| JP | 3904111 B2 | 1/2007 |
| JP | 2011-023966 | 2/2011 |

OTHER PUBLICATIONS

Chae, Youngcheol et al. "A 2.1 M Pixels, 120 Frame/s CMOS Image Sensor With Column-Parallel ΔΣ ADC Architecture" IEEE Journal of Solid-State Circuits, vol. 46, No. 1, Jan. 2011.

Yang, Woodward et al., "An Integrated 800×600 CMOS Imaging System" 1999 IEEE International Solid-State Circuits Conference, ISSCC99 / Sessions 17 / Paper Wa 17.3, pp. 304, 305 & 471.

Extended European Search Report Mailed May 12, 2015 for corresponding European Application No. 12 842 515.4.

Mahmoodi, A., et al. "Optimization of Delta-Sigma ADC for Column-Level Data Conversion in CMOS Image Sensors" Instrumentation and Measurement Technology Conference Proceedings, May 1, 2007, pp. 1-6 XP031182543, IEEE, PI.

Handoko, D., et al. "A High-Sensitivity CMOS Image Sensor with Gain-Adaptive Column Amplifiers" IEEE Journal of Solid-State Circuits, vol. 40, No. 5, May 1, 2005 pp. 1147-1156, XP011131312.

Guellec, F., et al, "Sigma-Delta Column-Wise A/D Conversion for Cooled ROIC" Infrared Technology and Applications XXXIII Proc. SPIE, vol. 6542 May 14, 2007, XP002738730.

\* cited by examiner

220A

300

SOLID-STATE IMAGE SENSOR AND CAMERA SYSTEM

TECHNICAL FIELD

The present invention relates to a solid-state image sensor represented by a CMOS image sensor, and a camera system.

BACKGROUND ART

In recent years, a CMOS (Complimentary Metal Oxide Semiconductor) image sensor has attracted attention as solid-state image sensor (image sensor) in place of a CCD.

This is because the CMOS image sensor has overcome problems below.

In other words, a dedicated process is needed for manufacturing CCD pixels, and a plurality of power-supply voltages are needed for operation thereof, and further, a plurality of peripheral ICs are needs to be combined to operate.

Various problems including that a system may be complicated very much in a case of such a CCD are overcome by the CMOS image sensor.

The CMOS image sensor can be applied with a process similar to that for a general CMOS type integrated circuit and can be driven by a single power supply, and further an analog circuit and logic circuit using a CMOS process can be arranged in the same chip an identical in a mixed manner.

For this reason, the CMOS image sensor has a plurality of great advantages that the number of the peripheral ICs can be reduces and the like.

Such a CMOS image sensor is widely used as an imaging sensor in an imaging apparatus including a digital camera, camcorder, high-definition single-lens reflex camera, monitoring camera, car-mounted camera, and guidance system with taking advantage of superiority in low power consumption and high-speed.

In addition, recently, an image sensor having high-performance and high image quality has come to appear in which a function circuit block such as image processing is also made in on-chip together.

The mainstream of an output circuit of the CCD is one channel (ch) output using an FD amplifier having a floating diffusion layer (FD: Floating Diffusion).

On the other hand, the CMOS image sensor has the FD amplifier for each pixel and the mainstream of the output thereof is a column-parallel output type in which one column in a pixel array is selected and read out to in a column direction at the same time.

This is because sufficient driving capability is hard to obtain in the FD amplifier arranged in the pixel and therefore data rate needs to be lowered, giving a parallel processing an advantage.

As for the signal output circuit of this column-parallel output type CMOS image sensor, varieties thereof have been proposed indeed. One form thereof is a type in which an analog-digital conversion device (hereinafter, abbreviated to an ADC (analog digital converter)) is provided for each column and a pixel signal is extracted as a digital signal.

The CMOS image sensor having a column parallel type ADC installed therein is disclosed in Non-Patent Literature 1 or Patent Literature 1, for example.

There has been proposed a CMOS image sensor using a ΔΣ modulator in order to achieve a highly accurate AD conversion (e.g., refer to Patent Literature 2 and Non-Patent Literature 2).

Patent Literature 2 describe a converter performing a delta-sigma (ΔΣ) AD conversion after analog CDS. The processing technology for an image signal in this CMOS image sensor of Patent Literature 2 passes a received optical signal from a photodiode in a pixel through an analog CDS circuit arranged for each column to remove noses contained in the signal and thereafter, performs ΔΣ AD conversion.

Non-Patent Literature 2 describes a ΔΣ type AD converter having a digital CDS function therein. The technology described in Non-Patent Literature 2 can increase the number of oversampling times to reduce the noise.

CITATION LIST

Patent Literature

Patent Literature 1: JP 2005-323331A
Patent Literature 2: JP 3904111B, FIG. 1

Non-Patent Literature

Non-Patent Literature 1: W. Yang et al. (W. Yan et. Al., "An Integrated 800×600 CMOS Image System," ISSCC Digest of Technical Papers, pp. 304-305, February, 1999)

Non-Patent Literature 2: A 2.1M Pixels, 120 frame/s CMOS Image Sensor with column-parallel ΔΣ ADC Architecture, FIG. 1, FIG. 5.

SUMMARY OF INVENTION

Technical Problem

However, since the technology described in Patent Literature 2 performs the AD conversion on the signal after the CDS, the noise in sampling remains.

In other words, in this technology, a kTC noise upon sampling the analog signal after the CDS remains, and therefore, increase in a capacity value or the like in order to reduce an influence leads to increase in a chip area.

In addition, the technology described in Non-Patent Literature 2 has to perform gain setting in order to widely secure an output digital value in an imaging state of low illumination, and disadvantageously the noise becomes multiplied by the gain.

In other words, this technology has to perform the gain setting in order to widely secure the output digital value in the imaging state of low illumination, and disadvantageously the noise becomes multiplied by the gain.

The present invention provides a solid-state image sensor and camera system which is able to achieve high image quality serving to reduce the noise in the low illumination without increasing the number of oversampling times.

Solution to Problem

According to a first embodiment of the present invention, there is provided a solid-state image sensor including a pixel array unit in which pixels are arrayed, the pixel including a photodiode converting an optical signal into an electrical signal, and a readout unit which reads out an analog image signal from the pixel to a signal line and processes the read out analog pixel signal in a unit of column. The readout unit includes a ΔΣ modulator which has a function to convert the analog pixel signal in to a digital signal, and an amplifier which is arranged on an input side of the ΔΣ modulator and amplifies the analog pixel signal read out to the signal line using a set gain to input the signal to the ΔΣ modulator.

According to a second embodiment of the present invention, there is provided a camera system including a solid-state image sensor, and an optical system forming a subject image on the solid-state image sensor. The solid-state image sensor includes a pixel array unit in which pixels are arrayed, the pixel including a photodiode converting an optical signal into an electrical signal, and a readout unit which reads out an analog image signal from the pixel to a signal line and processes the read out analog pixel signal in a unit of column. The readout unit including a ΔΣ modulator which has a function to convert the analog pixel signal in to a digital signal, and an amplifier which is arranged on an input side of the ΔΣ modulator and amplifies the analog pixel signal read out to the signal line using a set gain to input the signal to the ΔΣ modulator.

Advantageous Effects of Invention

According to the present invention, it is possible to achieve high image quality serving to reduce the noise in the low illumination without increasing the number of oversampling times.

DESCRIPTION OF EMBODIMENTS

Hereinafter, an explanation will be given of the embodiment of the present invention in relation to the drawings.

Here, the explanation is given in the following order.
1. Outline of solid-state image sensor configuration
2. Outline of readout circuit configuration
3. Circuit configuration example of amplifier and ΔΣ AD converter
4. Configuration example of camera system
<1. Outline of Solid-state Image Sensor Configuration>

Figure 1:
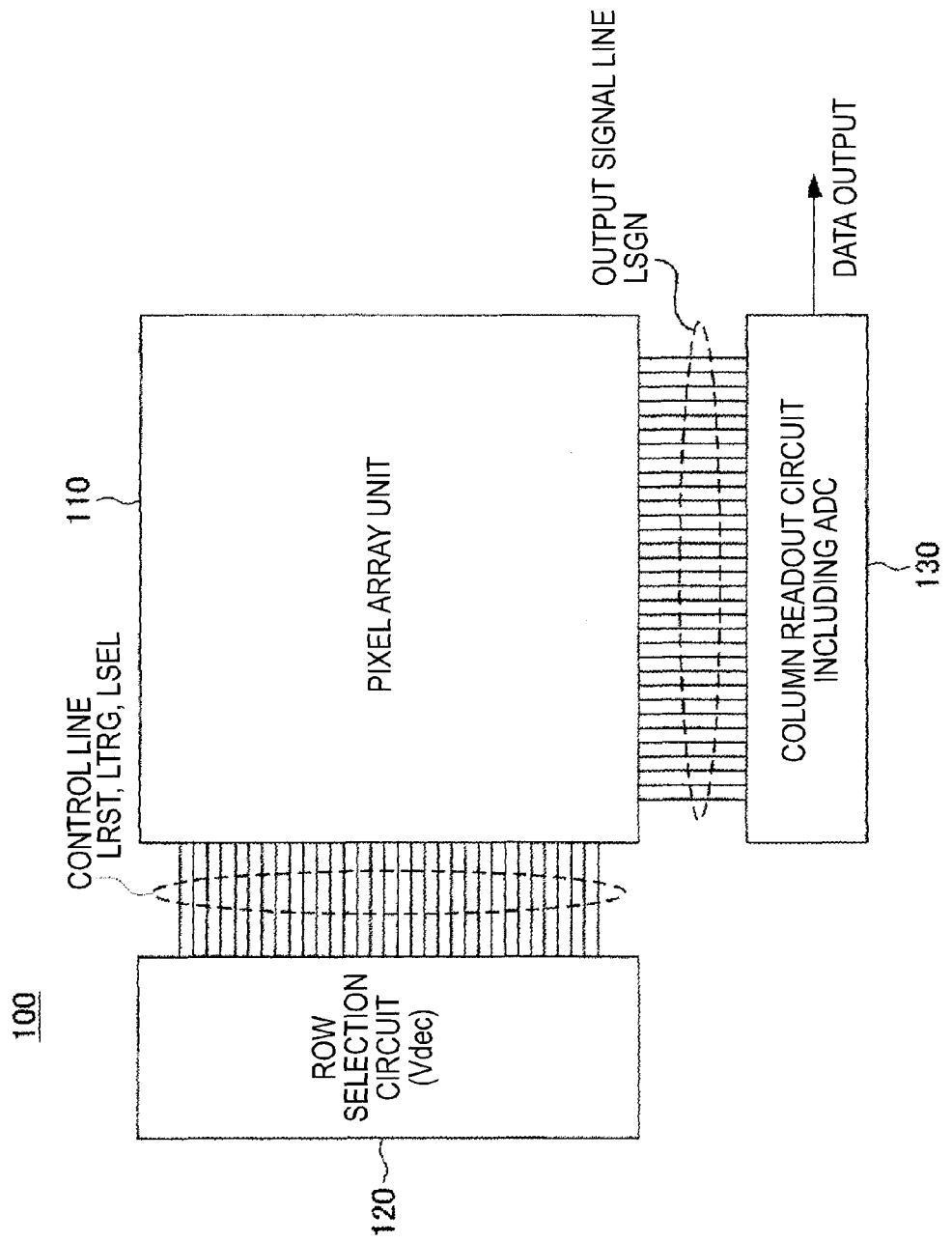
FIG. 1 is a diagram illustrating a configuration example of a CMOS image sensor (solid-state image sensor) according to this embodiment.

FIG. 1 is a diagram illustrating a configuration example of a CMOS image sensor (solid-state image sensor) according to this embodiment.

A CMOS image sensor 100 includes a pixel array unit 110, a row selection circuit (Vdec) 120 as a pixel drive part, and a column readout circuit 130 having an AD conversion function by ΔΣ modulation for each column.

In this embodiment, an AD conversion part constituted by a ΔΣ modulator having a ΔΣ modulation function, an amplifier arranged at an input stage of the ΔΣ modulator, and a decimation filter circuit arranged at an output stage of the ΔΣ modulator. For example, the ΔΣ AD converter using the ΔΣ modulator and decimation filter circuit is configured to output a pixel signal in a pixel unit.

In this embodiment, a CDS processing is performed after an AD conversion in the column readout circuit 130.

Here, the row selection circuit 120 and the column readout circuit 130 constitute a readout unit.

The CMOS image sensor 100 of this embodiment arranges an amplifier at an input stage of a ΔΣ converter so that a noise in low illumination can be improved, which is described later in detail.

The CMOS image sensor 100 this embodiment can be achieved by adjusting an AD input range to a constant range by the amplifier without change of a constant numerical for the ΔΣ AD converter.

The CMOS image sensor 100 can relax a noise specification of the ΔΣ AD converter by an effect due to the amplifier to reduce a capacity value, the number of sampling times or the like.

The CMOS image sensor 100 uses, as an amplifier, the same configuration as of the inverter used for the ΔΣ modulator, for example, such that a value to be level-shifted can be fixedly set independent of a gain, and an input range where the AD conversion can be performed is easily secured. Additionally, a differential type may be used as an amplifier.

Further, the CMOS image sensor 100 uses the ΔΣ AD converter such that the capacity value of the amplifier can be reduced.

The pixel array unit 110 has a plurality of pixel circuits 110A arrayed in two dimensions (a matrix) of M rows×N columns.

Figure 2:
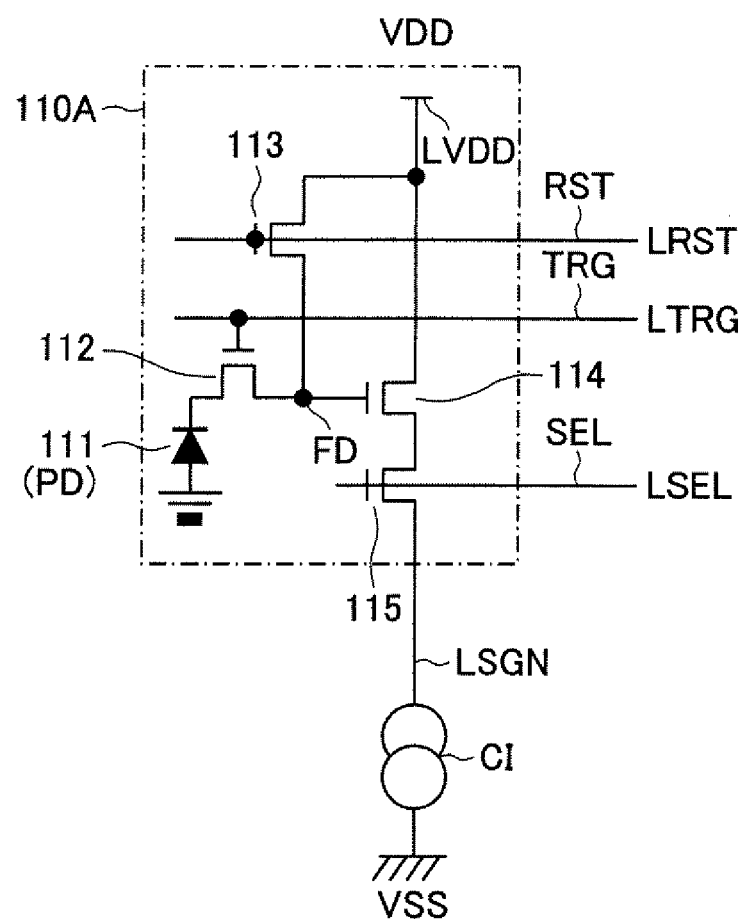
FIG. 2 is a diagram illustrating an exemplary pixel of the CMOS image sensor according to this embodiment.

FIG. 2 is a diagram illustrating an exemplary pixel of the CMOS image sensor according to this embodiment.

This pixel circuit 110A has a photodiode (PD: Photo Diode, hereinafter may be referred to as merely "PD") 111 as a photoelectric conversion element.

Then, the pixel circuit 110A has, with respect to this one photodiode 111, four transistors of a transfer transistor 112, reset transistor 113, amplifier transistor 114, and select transistor 115 as active elements.

The transfer transistor 112, reset transistor 113, amplifier transistor 114, and select transistor 115 are formed of an insulated gate type field-effect transistor (FET). In the example of FIG. 2, an n-channel FET is applied, but a p-channel FET may be also applied.

Note that here a four-transistor type pixel circuit example is shown, but a three-transistor type having the select transistor or the like may be also applied.

The photodiode 111 photoelectrically converts an incident light into an electrical charge (here, electron) of an amount corresponding to a light amount thereof.

The transfer transistor 112 is connected between the photodiode 111 and a floating diffusion FD (hereinafter, may be referred to as merely "FD") as an output node. The transfer transistor 112 is given a transfer signal TRG as a control signal via a transfer control line LTRG at a gate (transfer gate) thereof.

This allows the transfer transistor 112 to transfer the electrical charge (electron) photoelectrically converted by the photodiode 111 to the floating diffusion FD.

The reset transistor 113 is connected between a power supply line LVDD and the floating diffusion FD, and given a reset signal RST as a control signal via a reset control line LRST at a gate thereof.

This allows the reset transistor 113 to reset a potential of the floating diffusion FD to a potential of the power supply line LVDD.

The floating diffusion FD is connected with a gate of the amplifier transistor 114. The amplifier transistor 114 is connected with a signal line LSGN via the select transistor 115 and configures a source follower together with a constant current source CI outside the pixel.

Then, a selection signal SEL as a control signal corresponding to an address signal is given to a gate of the select transistor 115 via a select control line LSEL to turn on the select transistor 115.

When the select transistor 115 turns on, the amplifier transistor 114 amplifies the potential of the floating diffusion FD to output a voltage corresponding to the potential to the signal line LSGN. The voltage output from each pixel through the signal line LSGN is output to the column readout circuit 130.

These operations are carried out at the same time with respect to the pixels for one row because the respective gates of the transfer transistor 112 reset transistor 113, and select transistor 115 are connected in a unit of row, for example.

The reset control line LRST, transfer control line LTRG, and select control line LSEL which are wired in the pixel array unit 110 are wired as a set in a unit of row of a pixel array.

M lines of each of the controls lines LRST, LTRG, and LSEL are provided.

These reset control line LRST, transfer control line LTRG, and select control line LSEL are driven by the row selection circuit 120.

The row selection circuit 120 controls operations of the pixels arranged in any row in the pixel array unit 110. The row selection circuit 120 controls the pixels through the control lines LSEL, LRST, and LTRG.

The column readout circuit 130 receives data of a pixel row which is read out and controlled by the row selection circuit 120 via the signal line LSGN and transfers to the a signal processing circuit at a subsequent stage.

The readout circuit 130 includes the amplifier and the AD converter (a connected with an output thereof in each column.

The ADC is formed using the ΔΣ modulator having the ΔΣ modulation function, and the ADC using the ΔΣ modulator is configured to input and output the pixel signal in a unit of pixel, for example.

<2. Outline of Readout Circuit Configuration>

Figure 3:
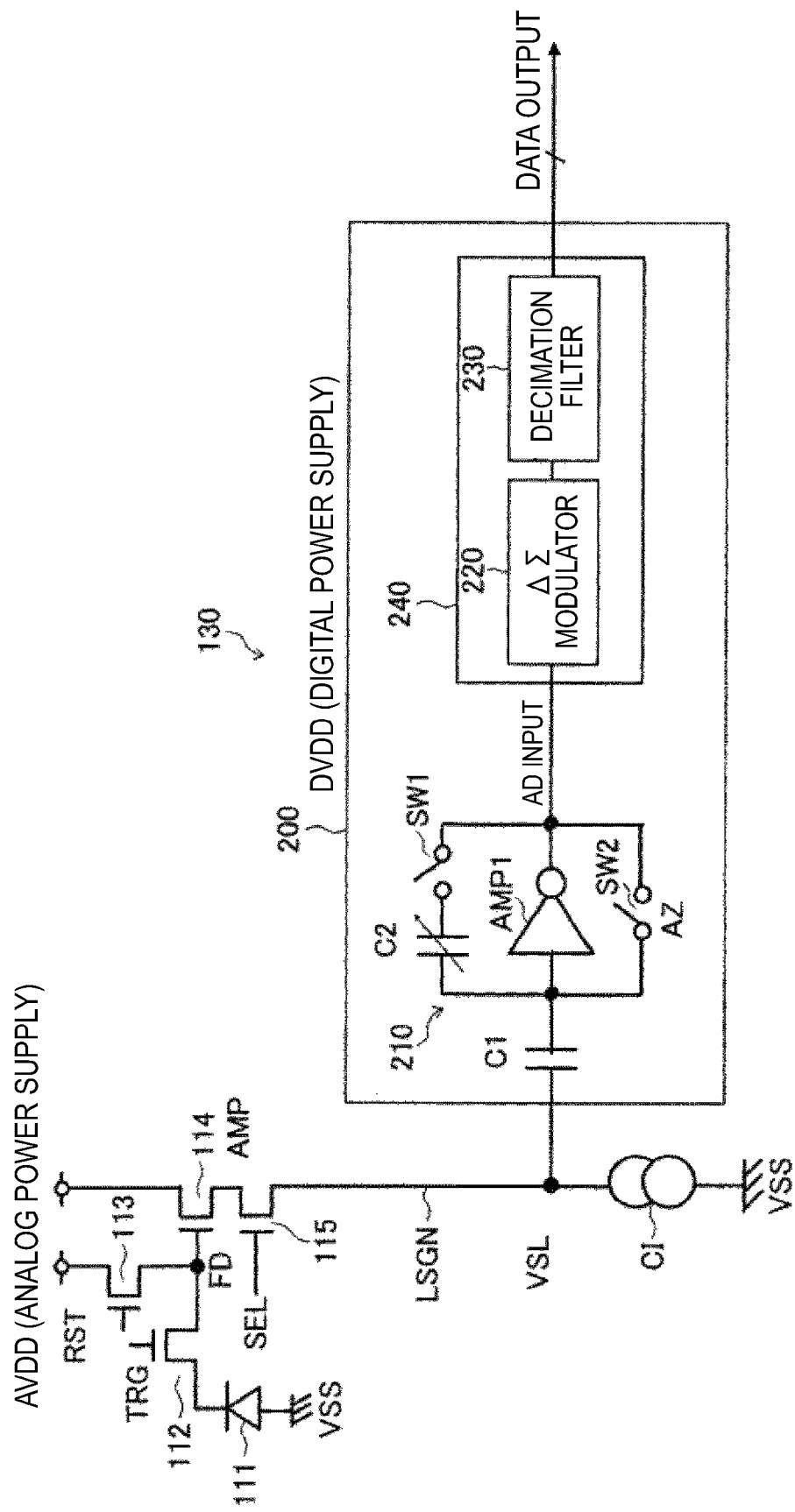
FIG. 3 is a diagram illustrating a basic configuration of a column circuit which is connected with a pixel and the signal line according to this embodiment.

FIG. 3 is a diagram illustrating a basic configuration of a column circuit which is connected with the pixel and the signal line according to this embodiment.

A column circuit 200, as shown in FIG. 3, is configured to include an amplifier 210 of which input is connected with the signal line LSGN, and a ΔΣ modulator 220 and decimation filter circuit which are continuously connected to an output of the amplifier 210.

Then, the ΔΣ modulator 220 and decimation filter circuit 230 continuously connected constitute a ΔΣ AD converter 240.

The example of FIG. 3 shows a configuration in which the pixel 110A is set as an analog power supply (AVDD), and the amplifier 210, ΔΣ modulator 220, and decimation filter circuit 230 are set as a digital power supply (DVDD).

As described below, depending on an amplitude level of the pixel, it may be possible to use in place of the amplifier a power supply having digital voltage or more, for example, an analog power supply.

The amplifier 210 is configured to include an inverter type amplifier AMP1, input capacitance C1, variable feedback capacitance C2, gain switch SW1, and auto-zero (AZ) switch SW2.

A first terminal of the input capacitance C1 is connected with the signal line LSGN, and a second terminal thereof is connected with an input terminal of the inverter type amplifier AMP1.

The feedback capacitance C2 and the gain switch SW1 are connected between an output terminal and input terminal of the inverter type amplifier AMP1.

The auto-zero switch SW2 is connected between the output terminal and input terminal of the inverter type amplifier AMP1.

In the amplifier 210, the auto-zero switch SW2 is turned on upon resetting the pixel 110A to cancel an offset of the inverter type amplifier AMP1 and the like and an input potential and an output potential are set to about (½) DVDD, for example.

The amplifier 210 can change the gain with a capacitance ratio C1:C2 between the input capacitance C1 and the feedback capacitance C2 being variable, and has a function to constantly maintain full-scale input range upon changing the gain of the ΔΣ modulator 220 as the AD converter.

In addition, as another embodiment, a differential amplifier may be used for improving power-supply voltage noise resistance.

Figure 4:
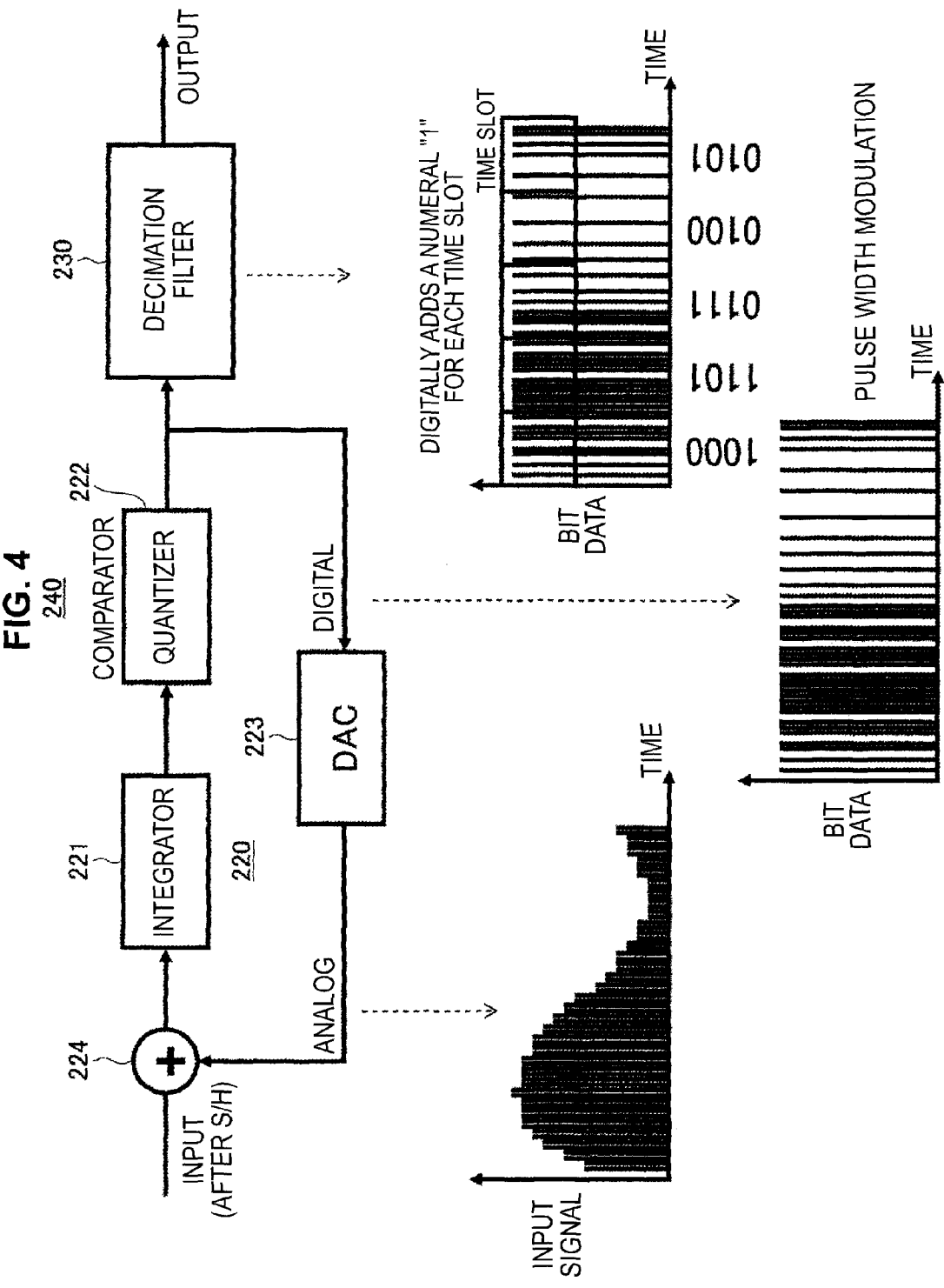
FIG. 4 is a diagram illustrating a basic configuration of a ΔΣ AD converter according to this embodiment.

FIG. 4 is a diagram illustrating a basic configuration of the ΔΣ AD converter according to this embodiment.

FIG. 4 illustrates an operation outline of the ΔΣ AD converter 240 together.

The ΔΣ modulator 220 is configured to include at least an integrator 221, quantizer 222, and digital analog converter (DAC) 223 forming a part of a feedback system for a pixel circuit 110A, and adder 224 having a level shift function.

In the ΔΣ modulator 220, a signal acquired from the pixel circuit 110A is output as one bit data through the integrator 221 and quantizer 222.

A decimation circuit (decimation filter circuit) 230 for converting the one bit data into multiple bits is arranged on the output side of the quantizer of the ΔΣ AD converter 240.

The decimation filter circuit 230 digitally adds a numeral "1" basically for each time slot.

Figure 5:
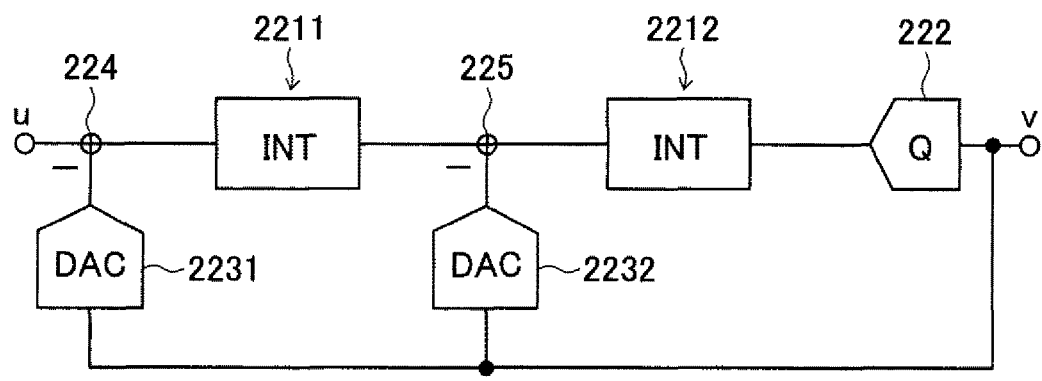
FIG. 5 is a diagram illustrating a basic configuration of a two-dimensional ΔΣ modulator according to this embodiment.
Figure 6:
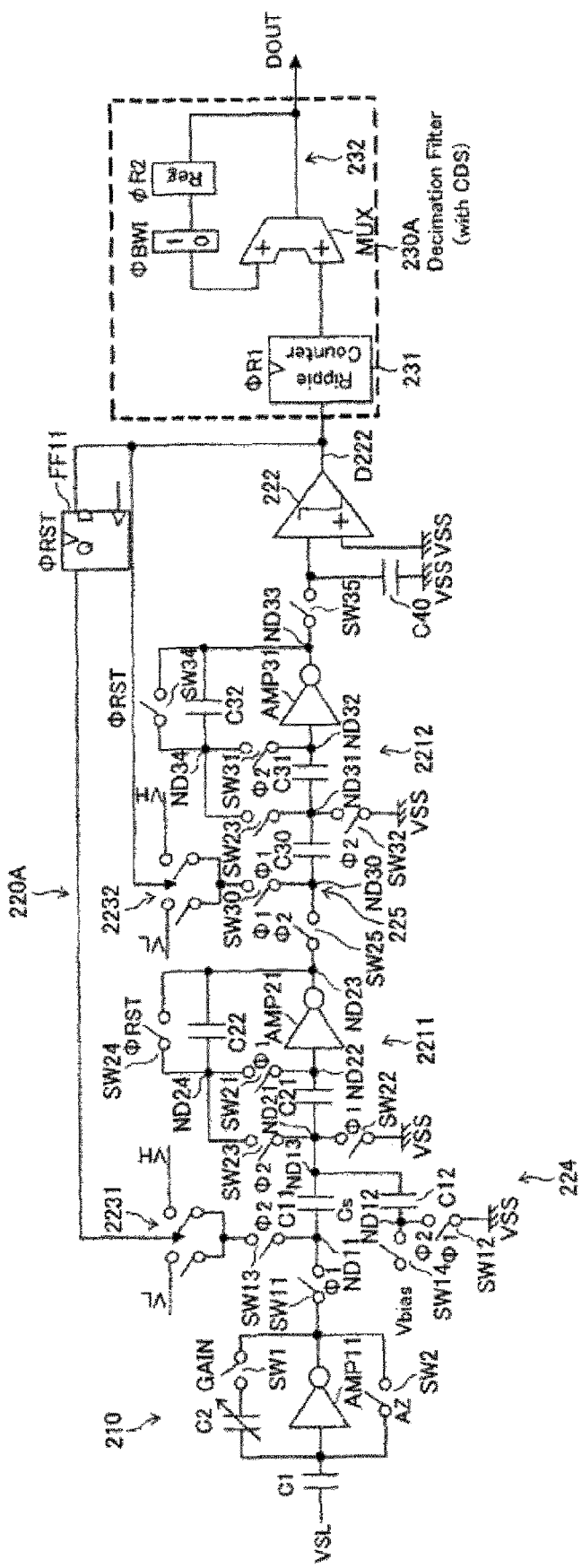
FIG. 6 is a diagram illustrating a specific circuit configuration of the column circuit including the ΔΣ AD converter applied with the two-dimensional ΔΣ AD converter according to this embodiment.

FIG. 4 shows the one-dimensional ΔΣ AD modulator 220 as an example, but an n-dimensional, for example, a two-dimensional ΔΣ modulator 220A is preferably applied as shown in FIG. 5 and FIG. 6.

Additionally, in the examples of FIG. 5 and FIG. 6, a two-dimensional decimation filter circuit 230A is applied as the decimation filter circuit. However, the decimation filter circuit may be applied with the third decimation filter circuit.

<3. Circuit Configuration Example of Amplifier and ΔΣ AD Converter>

FIG. 5 is a diagram illustrating a basic configuration of the two-dimensional ΔΣ modulator according to this embodiment.

FIG. 6 is a diagram illustrating a specific circuit configuration of the column circuit including the ΔΣ AD converter applied with the two-dimensional ΔΣ AD converter according to this embodiment.

FIG. 6 illustrates a circuit configuration in which a plurality of capacitances are switched from a chopper amplifier (amplifier) at a former stage of an input signal such that the pixel signal can be amplified as a characteristic of the present invention.

The two-dimensional ΔΣ modulator 220A is configured as an incremental ΔΣ AD converter as shown in FIG. 5, and configured to include two integrators 2211 and 2212, two DACs 2231 and 2232, and two adders 224 and 225 as the ΔΣ modulator.

Here, in FIG. 5, u represents the analog signal and v represents the digital signal.

The adder 224 functions as an input part.

A column circuit 200A in FIG. 6 has the amplifier 210 for a pixel signal VSL arranged at a former stage (input stage) of the ΔΣ modulator 220A to achieve the reduced noise in a high gain (low illumination) setting.

Additionally, the column circuit 200A can allow the circuit configuration of the amplifier 210 and a part of the circuit configuration of the ΔΣ modulator to be made similar to facilitate adjustment of an input level of the AD conversion.

The two-dimensional ΔΣ modulator 220A is configured as the incremental ΔΣ AD converter, and configured to include two integrators 2211 and 2212, two DACs 2231 and 2232, and two adders 224 and 225 as the ΔΣ modulator.

The CMOS image sensor having the incremental ΔΣ AD converter installed therein has a noise suppression effect depending on to the number M of oversampling times.

The adder 224 receives the pixel signal VSL amplified by the amplifier 210 or a signal fed back via the DAC 2231.

The adder 224, when receiving the pixel signal VSL by the amplifier 210, shifts the level thereof (level down in the example of FIG. 6) to the integrator 2211 in a first stage.

The adder 224 includes capacitances C11 (Cs) and C12, nodes ND11 to ND13, and switches SW11 to SW14.

The capacitance C11 is connected between the node ND11 and the node ND13, and the capacitance C12 is connected between the node ND12 and the node ND13.

The SW11 is connected between the output of the amplifier 210 and the node ND11, and the switch SW12 is connected between the node ND12 and a reference potential (e.g., ground) VSS.

The switch SW13 is connected between an output of the DAC 2231 and the node ND11, and the switch SW14 is connected between the node ND12 and a supply line of a bias signal Vbias.

The switches SW11 and SW12 are maintained in a conducting state while a signal χ1 is active (e.g., high level), and the switches SW13 and SW14 are maintained in the conducting state while a signal χ2 is active (e.g., high level).

The signal χ1 and the signal χ2 take complementary levels. Therefore, while the switches SW11 and SW12 are maintained in the conducting state, the switches SW13 and SW14 are maintained in a non-conducting state. On the other hand, while the switches SW13 and SW14 are maintained in the conducting state, the switches SW11 and SW12 are maintained in the non-conducting state.

In the adder 224, the capacitance C12 and the switch SW12 function as a level shifter.

The integrator 2211 at the first stage includes an inverter type amplifier AMP21 functioning as an integration circuit, input capacitance C21, feedback capacitance C22, nodes ND21 to ND24, and switches SW21 to SW25.

The node ND21 is connected with the output node ND13 of the adder 224.

The inverter type amplifier AMP21 has an input terminal connected with the node ND22 and an output terminal connected with the node ND23.

The input capacitance C21 is connected between the node ND21 and the node ND22, ante the feedback capacitance C22 is connected between the node ND24 and the node ND23.

The switch SW21 is connected between the node ND22 and the node ND24. In other words, the feedback capacitance C22 and the switch SW21 are connected in series between an output terminal and input terminal of the inverter type amplifier AMP21.

The switch SW22 is connected between the node ND21 and a reference potential (e.g., ground) VSS.

The switch SW23 is connected between the node ND21 and the node ND24, and the switch SW24 is connected between the node ND23 and the node ND24. In other words, the switch SW24 for reset is connected between the output terminal and input terminal of the inverter type amplifier AMP21.

The switch SW25 is connected with the node ND23 as an output node of the integrator 2211 at the first stage.

The switch SW21 and the SW22 are maintained in the conducting state while the signal χ1 is active (e.g., high level), and the switch SW23 is maintained in the conducting state while the signal χ2 is active (e.g., high level).

The signal χ1 and the signal χ2 take complementary levels. Therefore, while the switches SW21 and the SW22 are maintained in the conducting state, the switch SW23 is maintained in the non-conducting state. On the other hand, while the switch SW23 is maintained in the conducting state, the switch SW21 and the SW22 are maintained in the non-conducting state.

The switch SW24 is maintained in the conducting state while a reset signal χRST is active (e.g., high level). The reset signal χRST is synchronized in the same phase as the reset signal RST for pixel.

The switch SW25 is maintained in the conducting state while the signal χ2 is active, and inputs the output of the integrator 2211 at the first stage to the adder 225 at the subsequent stage.

The adder 225 includes a capacitance C30, node ND30, and switch SW30.

The node ND30 is connected with the output switch SW25 of the integrator 2211 at the first stage.

The switch SW30 is connected between an output of the DAC 2232 and the node ND30, and the capacitance C30 is connected between the node ND30 and an input node (ND31) of the integrator 2212 at a second stage as the subsequent stage.

The switch SW30 is maintained in the conducting state while the signal χ1 is active (e.g., high level).

The integrator 2212 at the second stage includes an inverter type amplifier AMP31 functioning as an integration circuit, input capacitance C31, feedback capacitance C32, nodes ND31 to ND34, and switches SW31 to SW35.

The node ND31 is connected with the capacitance C30 of the adder 225.

The inverter type amplifier AMP31 has an input terminal connected with the node ND32 and an output terminal connected with the node ND33.

The input capacitance C31 is connected between the node ND31 and the node ND32, ante the feedback capacitance C32 is connected between the node ND34 and the node ND33.

The switch SW31 is connected between the node ND32 and the node ND34. In other words, the feedback capacitance C32 and the switch SW31 are connected in series between an output terminal and input terminal of the inverter type amplifier AMP31.

The switch SW32 is connected between the node ND31 and a reference potential (e.g., ground) VSS.

The switch SW33 is connected between the node ND31 and the node ND34, and the switch SW34 is connected between the node ND33 and the node ND34. In other words, the switch SW34 for reset is connected between the output terminal and input terminal of the inverter type amplifier AMP31.

The switch SW35 is connected with the node ND33 as an output node of the integrator 2212 at the second stage.

The switches SW31 and SW32 are maintained in the conducting state while the signal χ2 is active (e.g., high level), and the switch SW23 is maintained in the conducting state while the signal χ1 is active (e.g., high level).

The signal χ1 and the signal χ2 take complementary levels. Therefore, while the switches SW31 and SW32 are maintained in the conducting state, the switch SW33 is maintained in the non-conducting state. On the other hand, the switch SW33 is maintained in the conducting state, the switches SW31 and SW22 are maintained in the non-conducting state.

Therefore, the integrator 2212 at the second stage operates in a phase the reverse of the integrator 2211 at the first stage to perform a complementary processing.

The switch SW34 is maintained in the conducting state while the reset signal χRST is active (e.g., high level). The reset signal χRST is synchronized in the same phase as the reset signal RST for pixel.

The switch SW35 is maintained in the conducting state while the signal χ1 is active, and inputs the output of the integrator 2212 at the second stage to one of input terminals of the quantizer 222 at the subsequent stage.

The quantizer 222 has one input terminal connected with a capacitance C40 between itself and a reference potential (e.g., ground) VSS, and the other input terminal connected with a reference potential VSS.

A digital signal D222 output from the quantizer 222 is fed back to the on-bit DAC 2232 and fed back to the one-bit DAC 2231 via a flip-flop FF11.

The digital signal D222 output from the quantizer 222 is output to the decimation filter 230 at the subsequent stage.

The two-dimensional decimation filter circuit 230A is constituted by an integrator (ripple counter) 231 and an accumulating device (accumulator) 232 for holding and adding the data. The accumulator 232 is configured to include an adder, register REG and the like.

As described above, this column circuit 200A is applied with an inverter (type amplifier) as an integrator for the ΔΣ ADC 220A. This allows, not only by reducing the number of elements for layout efficiency and lowered consumption but also by carrying out auto-zeroing, offset and flicker noise of the inverter to be canceled.

A difference between the pixel signal upon resetting and feedback signals from the one-bit DACs 2231 and 2232 is taken, and the pixel signal is input to the integrators (inverter type amplifier) 2211 and 2212 at the first stage and the second stage.

After integrated here, the pixel signal is input to the quantizer (comparator) 222, and 1 or 0 is output in comparison to a certain constant voltage. Then, this output from the quantizer 222 is input through a feedback loop to the one-bit DACs 2231 and 2232.

The one-bit 1 DACs 2231 and 2232 subtract a constant voltage from the input signal in response to 1 or 0 from the quantizer 222, and input the result to the integrators (inverter type amplifier) 2211 and 2212 via the adders 224 and 225.

The decimation filter circuit 230A integrates a compressional wave signal of 1 or 0 with respect to a certain time (every 7 bits in prior art 1), and data thereof is accumulated to convert into 14 bit-digital output.

In addition, after the decimation filter 230 carries out superposition integral on the reset signal for pixel as a compressional wave signal, bit inverting is performed to similarly accumulate data signal for pixel and achieve a digital CDS, achieving reduced charge injection noise by the switch.

This embodiment uses the two-dimensional decimation filter circuit configuration, but two or more-dimensional configuration can be used.

[Analog Gain and Input Range]

Next, an explanation will be given of analog gain of the amplifier 210 arranged at the input stage of the ΔΣ ADC 200A and an input range of the ΔΣ ADC 200A.

Table 1 shows an analog gain setting example for the amplifier 210 in this embodiment.

Example of Analog Gain Setting and Circuit Constant

| Analog Gain [dB] | Signal amplitude [mV] | Gain [C1/C2] | ADC input range [mV] |
|---|---|---|---|
| 0 | 1000 | 0.5 | 500 |
| 6 | 500 | 1 | |
| 12 | 250 | 2 | |
| 18 | 125 | 4 | |

In the example of Table 1, during high illumination (an input amplitude is 1V, for example), the capacitance ratio C1:C2 between the input capacitance and feedback capacitance of the amplifier 210 is set to 1:2, and thereby the pixel signal is multiplied by ½ and input to the ΔΣ modulator. At this time, the input range of the ΔΣ ADC 220A is 0.5V.

Additionally, during low illumination with less incident light amount (input amplitude is 125 mV), the capacitance ratio is set to 1:0.25, and thereby signal amplification of 18 dB (eightfold) is achieved to adjust the input range of AD to 0.5V.

In other words, a full-scale input range seen from the ΔΣ ADC 220A is also constant even upon changing the gain, configuration may be such that the constant numerical such as the capacitance ratio of the ΔΣ modulator and the like is fixed.

Here, in the example of Table 1, when the input amplitude is 500 mV, the capacitance ratio is set to 1:1, and thereby the signal amplification of 6 dB (twofold) is achieved to adjust the input range of AD to 0.5V.

When the input amplitude is 250 mV, the capacitance ratio is set to 1:0.5, and thereby the signal amplification of 12 dB (fourfold) is achieved to adjust the input range of AD to 0.5V.

[Operation Timing Example of Pixel and Column Circuit]

Figure 7:
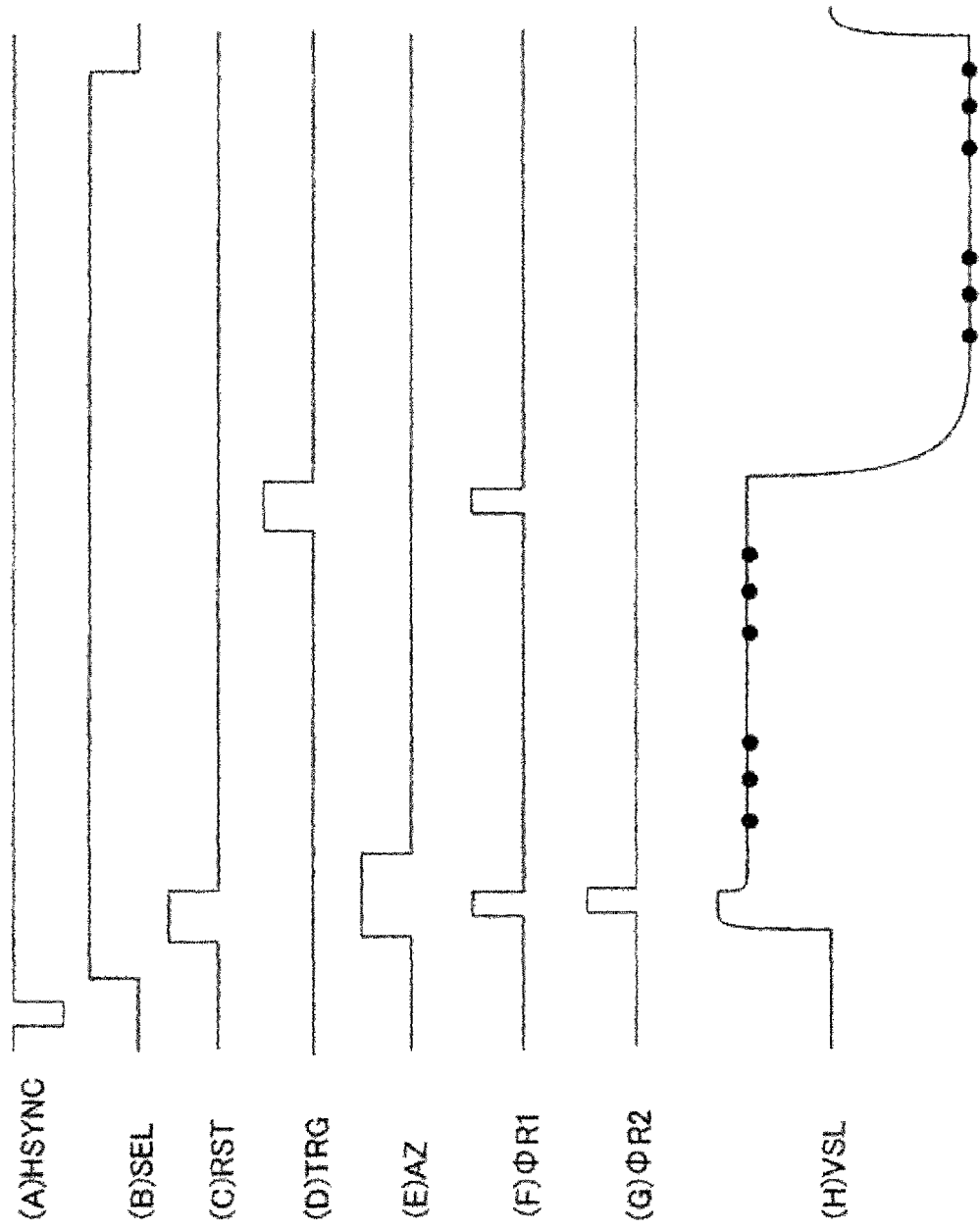
FIG. 7 is a timing chart illustrating an operation timing example of the pixel and column circuit in this embodiment.

(A) to (H) of FIG. 7 are timing charts illustrating an operation timing example of the pixel and column circuit in this embodiment.

(A) of FIG. 7 illustrates a horizontal synchronizing signal HSYNC representing one horizontal scanning period, and (B) of FIG. 7 illustrates a selection signal SEL for pixel, (C) of FIG. 7 illustrates a reset signal RST for pixel, and (D) of FIG. 7 represents a transfer signal TRG for pixel.

(E) of FIG. 7 illustrates an auto-zero signal AZ supplied to the switch SW2 of the amplifier 210. (F) of FIG. 7 illustrates the reset signal χR1 of the ripple counter 231 of the decimation filter circuit 230A, (G) of FIG. 7 illustrates the reset signal χR2 of the accumulator 232 of the decimation filter circuit 230A. (H) of FIG. 7 illustrates the pixel signal VSL read out to the signal line LSGN.

In the pixel 110A, after the selection signal SEL for row rises, the floating diffusion FD is reset in the reset signal RST. At that time, resetting of the amplifier 210 (auto-zero AZ) is performed to decide offset cancel of the amplifier 210 and an operation voltage of reset signal (around ½ of DVDD in this explanation).

After that, the pixel signal VSL is read out using the transfer signal (transfer pulse) TRG to output data signal.

The ΔΣ ADC 220A performs a plural times of samplings (oversampling M) of the reset signal and data signal by the integrators 2211 and 2212 to carry out averaging.

At that time, the ripple counter 231 of the decimation filter circuit 230 is reset and the accumulating device (accumulator) 232 is reset by pulses χR1 and χR2.

[Level Diagram]

Next, an explanation will be given of a level diagram of the column circuit during high illumination and during low illumination according to this embodiment. Here, a level diagram of a circuit during high illumination and during low illumination in FIG. 5 of Non-Patent Literature 2 is shown as a comparative example.

Figure 8:
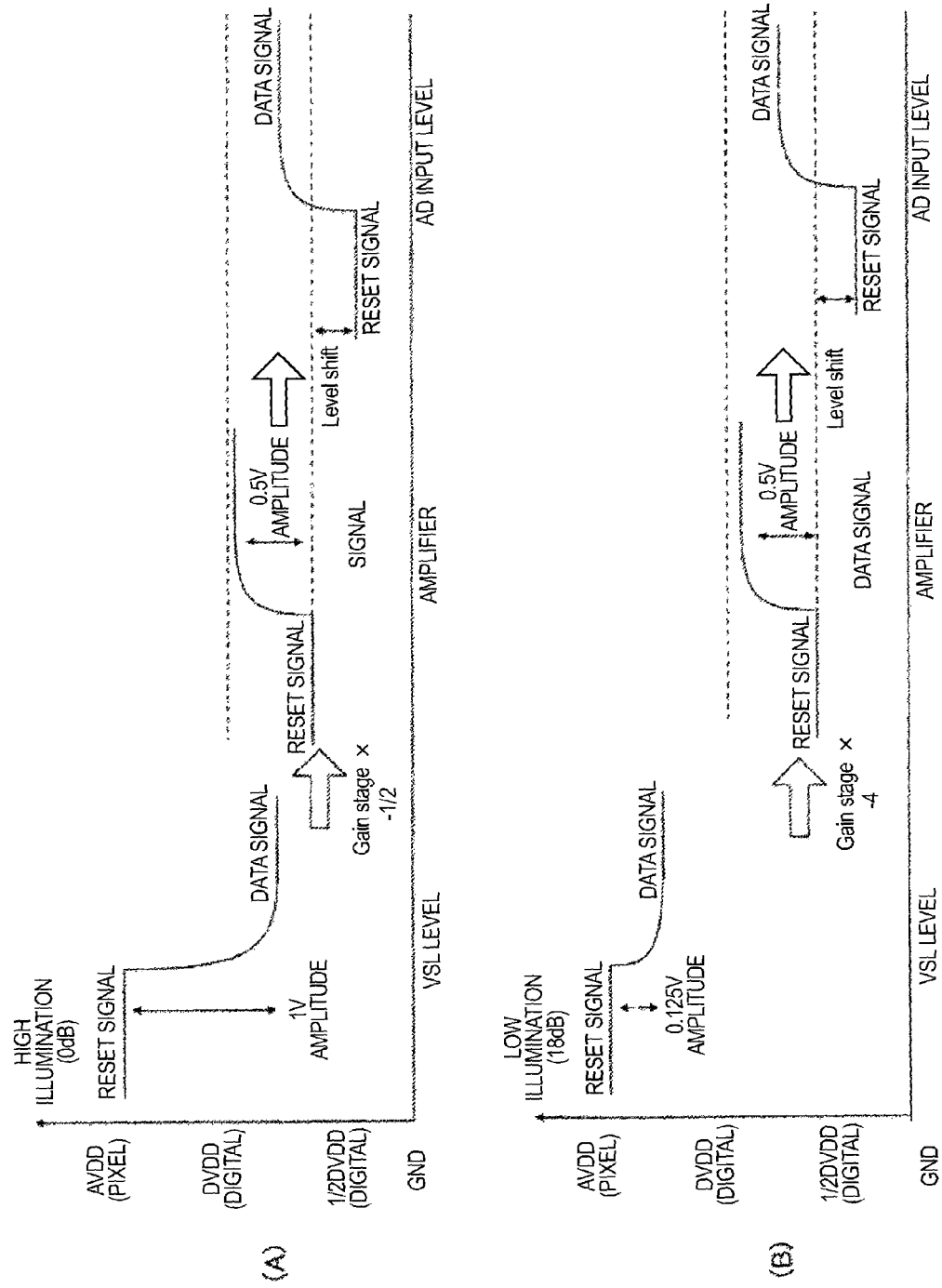
FIG. 8 is a diagram for explaining a level diagram of the column circuit during high illumination and during low illumination according to this embodiment.

(A) and (B) of FIG. 8 are diagrams for explaining a level diagram of the column circuit during high illumination and during low illumination according to this embodiment.

Figure 9:
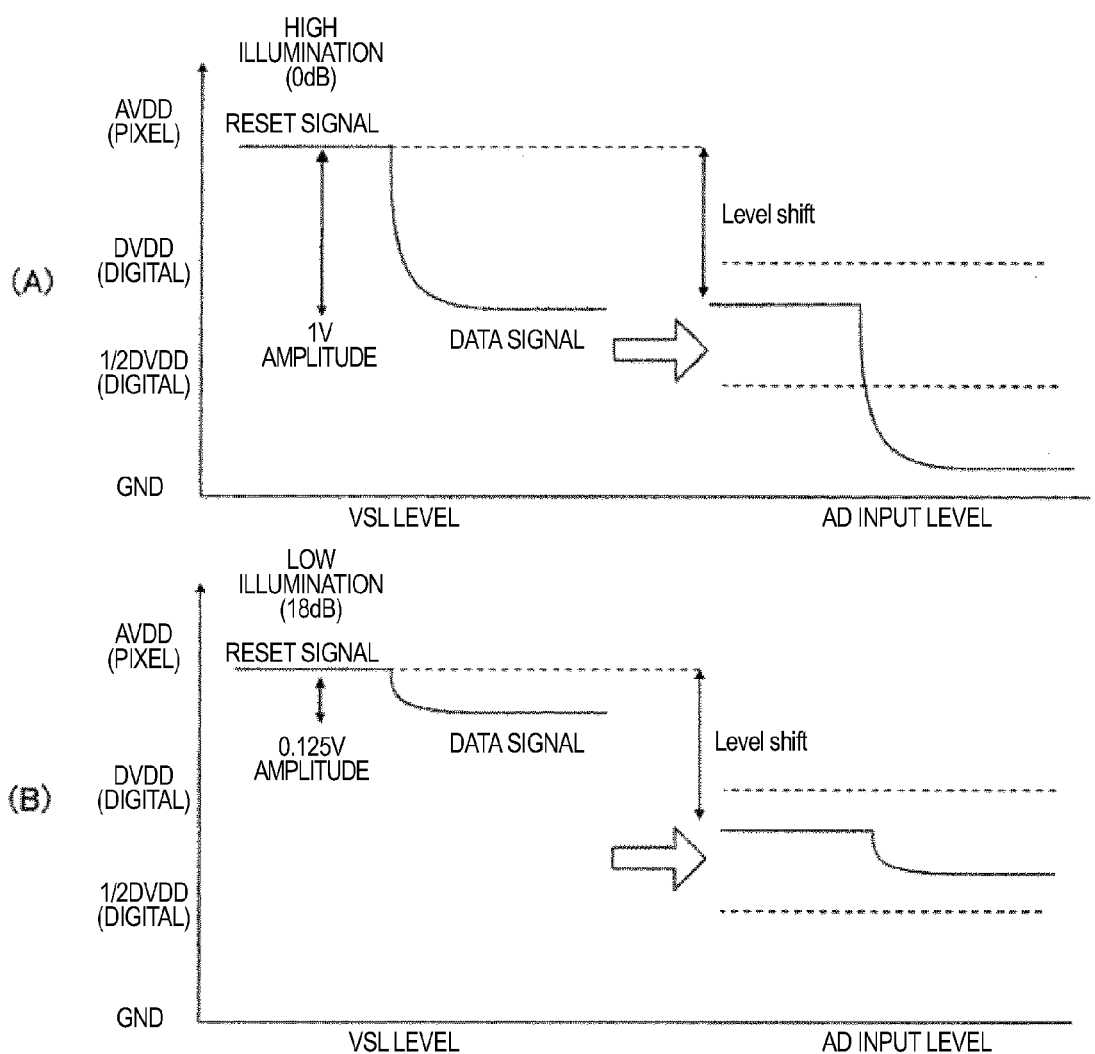
FIG. 9 is a diagram for explaining a level diagram of a circuit during high illumination and during low illumination in a comparative example.

(A) and (B) of FIG. 9 are diagrams for explaining a level diagram of a circuit during high illumination and during low illumination in the comparative example.

As shown in FIG. 9, in a configuration of the comparative example, if the input signals in high illumination and low illumination are shifted in level with a fixed value, the input range as the AD converter is varied from around ½ of DVDD and stability is hard to secure.

In order to prevent this, if a method for varying a level shift value by an incident light amount is taken, a bias (Vbias) circuit configuration becomes complex.

In this embodiment, the same size ratio the integrators 2211 and 2212 (PMOS/NMOS) is employed for the amplifier 210, and thereby as shown in FIG. 8, an inversion level upon auto-zeroing is set around ½ of DVDD regardless of the incident light amount.

When the signal upon auto-zeroing is input to the ΔΣ modulator as the reset signal, the level shift has to be performed to match the AD input range.

In this embodiment, not only that the input amplitude range is uniformed by the gain setting in the amplifier 210 but also that the ΔΣ modulator 220A has a configuration of the size ratio the same as the amplifier 210 to have an operation point set to similar degree, and thereby a level shift amount can also be set as a fixed value.

This eliminates the need for the bias value Vbias to be particularly changed and allows the circuit configuration to be simple.

Figure 10:
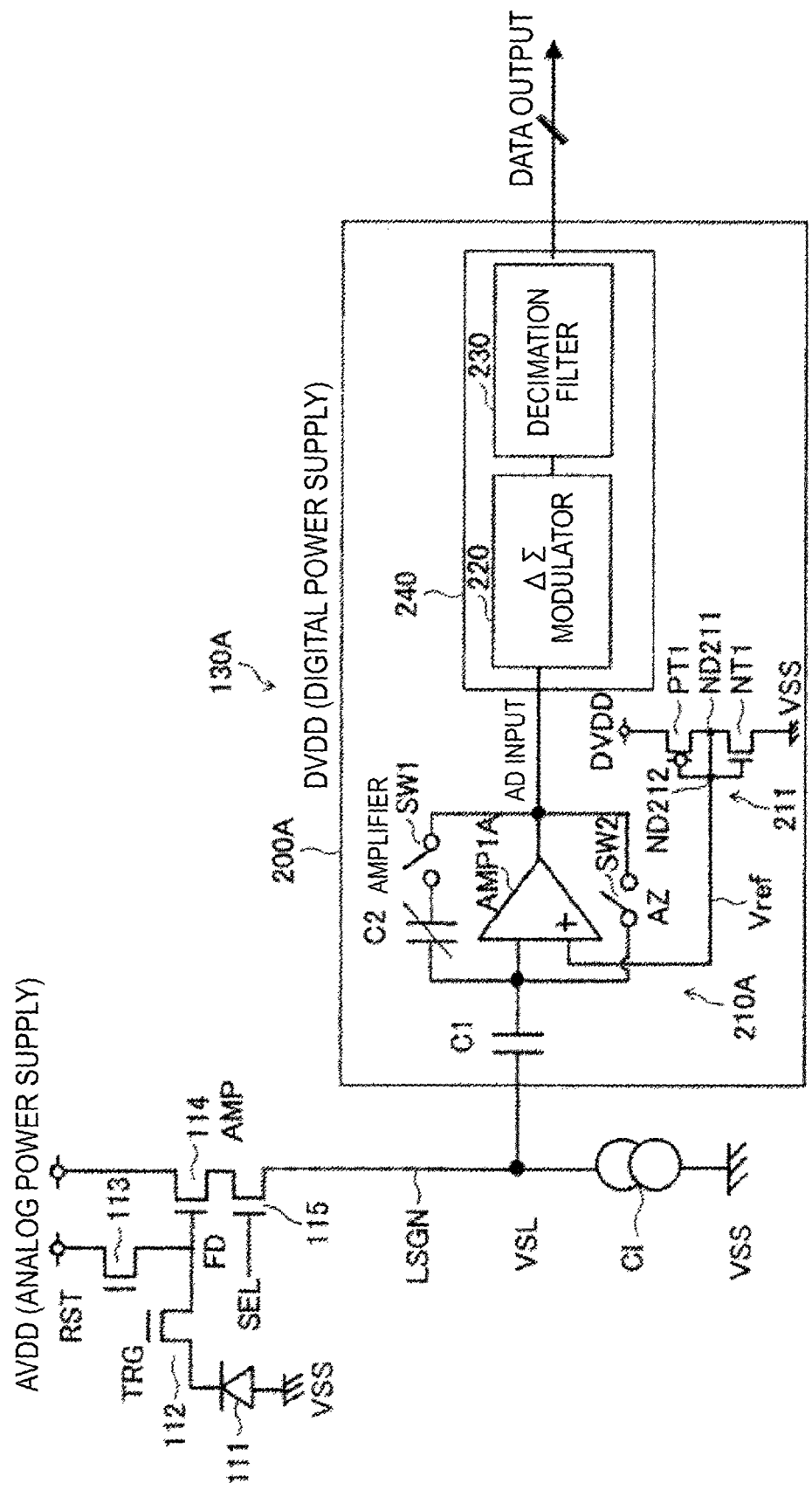
FIG. 10 is a diagram illustrating another configuration in which a differential amplifier is applied to an amplifier in the column circuit which is connected with the pixel and the signal line according to this embodiment.

Here, the present invention is explained using the inverter type amplifier (amplifier) as an example, but as shown in FIG. 10, may be achieved using even a differential amplifier with a reference voltage (Vref) being generated using the integrator (inverter type) of the ΔΣ modulator 200 and the size ratio (PMOS/NMOS).

FIG. 10 is a diagram illustrating another configuration in which a differential amplifier is applied to an amplifier in the column circuit which is connected with the pixel and the signal line according to this embodiment.

The amplifier 210A is configured to include a differential amplifier AMP1A, input capacitance C1, variable feedback capacitance C2, gain switch SW1, auto-zero (AZ) switch SW2, and reference voltage generation part 211.

The first terminal of the input capacitance C1 is connected with the signal line LSGN, and the second terminal is connected with one input terminal of the differential amplifier AMP1A.

The feedback capacitance C2 and the gain switch SW1 are connected in series between an output terminal of the differential amplifier AMP1A and one input terminal.

The auto-zero switch SW2 is connected between the output terminal of the differential amplifier AMP1A and one input terminal.

Then, the reference voltage generation part 211 is formed of a PMOS transistor PT1 and NMOS transistor NT1 which are connected in series between the digital power supply DVDD and the reference potential VSS. A connection point between a drain of the PMOS transistor PT1 and a drain of the NMOS transistor NT1 forms a node ND211 and a connection point between the gates thereof forms a node ND212. These nodes ND211 and ND212 are connected with each other to be connected with the other input terminal of the differential amplifier AMP1A.

The reference voltage generation part 211 supplies a reference voltage Vref which is generated using a size ratio (PMOS/NMOS) as much as the element forming the above inverter type integrator to the other input terminal of the differential amplifier AMP1A.

In this example also, not only that the input amplitude range is uniformed by the gain setting in the amplifier 210A but also that the ΔΣ modulator 220 has a configuration of the size ratio the same as the amplifier 210A to have an operation point set to similar degree, and thereby a level shift amount can also be set as a fixed value.

This eliminates the need for the bias value Vbias to be particularly changed and allows the circuit configuration to be simple.

FIG. 3 and FIG. 10 describes that the power supply for the amplifiers 210 and 210A and the ΔΣ AD converter are the same power supply, but even if in place of the amplifiers 210 and 210A used is a power supply having digital voltage or more, for example, an analog power supply (AVDD), only the level shift value is increased and the fixed value can be used.

In addition, variation in reset potential for pixel can be absorbed by carrying out auto-zeroing.

[Noise Reduction Effect by Analog Gain]

Additionally, besides the averaging by the incremental type, the noise reduction effect by the analog gain may be expected in the configuration of the column circuit according to this embodiment.

An explanation will be given of calculation of quantization noise in the incremental type, kTC noise, and noise in the amplifier.

A total noise Vn in a case of using the two-dimensional ΔΣ modulator and the decimation filter circuit can be represented by averaging using the oversampling M as follows.

It is represented by $Vn^2=Vs^2*4/(3M)$.

Here, $Vs^2=Vsf$ (source follower)$^2$+Vadc (AD converter).

Owing to a draw-back effect due to an analog gain G and the averaging effect due to the oversampling M, an amplifier thermal noise Vamp$^2$, quantization noise VSLB$^2$, kTC noise Vadc$^2$ of the ΔΣ modulator can be represented as follows.

$Vamp^2=4/3M*kT/3G^2*(1+G)/(Cs+C1/(1+G))$
$VLSB^2=4/(G*(M+1)*M)^2*VFS^2$
$Vadc^2=4/(3G^2*M)*5*k*T/Cs$, where, C11=Cs, G=C1/C2, VFS is a quantizer full-scale voltage, k is Boltzmann coefficient.

That is to say, if there is a condition where the gain setting has to be performed in order to secure the signal output in a state of low illumination, noise characteristic may be improved by the above analog gain draw-back effect.

On the other hand, in the configuration of the comparative example, the digital output has to be multiplied by the gain, leading to increase in not only the signal but also the noise.

In this embodiment, also in the amplifier 210, the oversampling effect by combining with the ΔΣ circuit configuration reduces the thermal noise.

Therefore, less capacitance can be used as compared with a configuration of a simple amplifier and AD converter, allowing a cost reduction effect of smaller layout mounting area or handling of miniaturized pixel.

This embodiment is explained using the two-dimensional decimation filter, but the same effect can be obtained using a more multi (three-dimensional) filters configuration.

As explained above, according to this embodiment, the following effects can be obtained.

The amplifier is installed in the CMOS image sensor having the ΔΣ AD converter installed therein such that the noise in low illumination can be improved.

The input signal is adjusted to be in a constant range by the amplifier such that the gain setting can be made without changing the constant numerical of the ΔΣ AD converter. A circuit does not have to be added to the AD conversion part, allowing a chip area to be smaller. Further, the level shift value can be fixed independent of an amplifying rate, simplifying the circuit configuration.

The noise specification of the ΔΣ AD converter can be relaxed by the amplifier effect, achieving shrink of the chip area owing to the capacity value being able to be made smaller, or low power consumption owing to the number of sampling times being able to be reduced and clock frequency being able to be lowered.

Further, the amplifier can have a mounting area reduced by the averaging effect of the ΔΣ AD conversion.

The solid-state image sensor having such effects can apply as an imaging device a digital camera and video camera.

<4. Configuration Example of Camera System>

Figure 11:
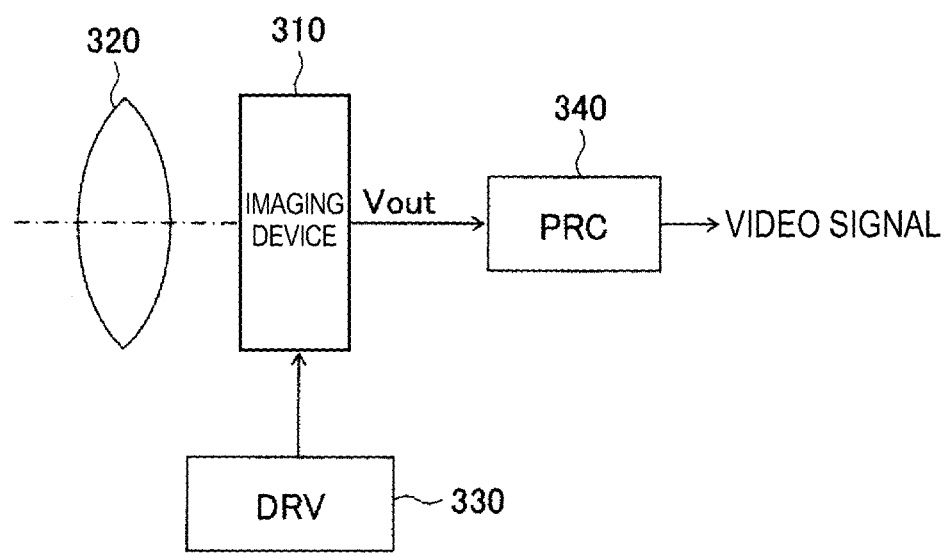
FIG. 11 is a diagram illustrating an exemplary configuration of the camera system applied with the solid-state image sensor according to this embodiment.

FIG. 11 is a diagram illustrating an exemplary configuration of the camera system applied with the solid-state image sensor according to this embodiment.

This camera system 300, as shown in FIG. 11, has an imaging device 310 to which the CMOS image sensor (solid-state image sensor) 100 according to this embodiment can be applied.

Further, the camera system 300 includes an optical system which guides an incident light (forms a subject image) on a pixel area of this imaging device 310, for example, a lens 320 forming an image from the incident light (image light) on an imaging area.

The camera system 300 includes a drive circuit (DRV) 330 driving the imaging device 310, and a signal processing circuit (PRC) 340 processing the output signal of the imaging device 310.

The drive circuit 330 has a timing generator (not shown in the figure) which generates various timing signals including a start pulse and clock pulse for driving circuits in the imaging device 310 to drive the imaging device 310 with a predetermined timing signal.

In addition, the signal processing circuit 340 performs a predetermined signal processing on the output signal of the imaging device 310.

The image signal processed in the signal processing circuit 340 is recorded in a record medium, for example, a memory. Image information recorded in the record medium is hard-copied by a printer or the like. Further, the image signal processed in the signal processing circuit 340 is displayed on a monitor including a liquid crystal display as a moving picture.

As described above, the above described solid-state image sensor 100 is installed as the imaging device 310 in an imaging apparatus such as a digital still camera, achieving the camera of the low power consumption and highly accurate.

Additionally, the present technology may also be configured as below.

(1)

A solid-state image sensor including:

a pixel array unit in which pixels are arrayed, the pixel including a photodiode converting an optical signal into an electrical signal; and a readout unit which reads out an analog image signal from the pixel to a signal line and processes the read out analog pixel signal in a unit of column, wherein the readout unit includes a ΔΣ modulator which has a function to convert the analog pixel signal in to a digital signal; and an amplifier which is arranged on an input side of the ΔΣ modulator and amplifies the analog pixel signal read out to the signal line using a set gain to input the signal to the ΔΣ modulator.

(2)

The solid-state image sensor according to (1), wherein the amplifier can perform a gain setting corresponding to an input amplitude of the analog pixel signal and performs amplification such that a full-scale input range of the ΔΣ modulator is constant.

(3)

The solid-state image sensor according to (2), wherein the ΔΣ modulator has input part which performs level shift of the pixel signal amplified by the amplifier to input the signal to an integrator, and wherein an amount of the level shift is set as a fixed value.

(4)

The solid-state image sensor according to any one of (1) to (3), wherein the ΔΣ modulator is formed as n-dimensional (n is a positive number including 1) modulator, the ΔΣ modulator including at least one integrator having an inverter type integrator;

a quantizer which quantizes an output signal of the integrator as the last stage and outputs a digital signal, and a digital analog converter which converts the digital signal by the quantizer into an analog signal and feeds back on an input side of the integrator, and wherein the amplifier includes an inverter type amplifier or differential amplifier that have the same configuration as the inverter type integrator of the integrator.

(5) The solid-state image sensor according to (4), wherein the integrator of the ΔΣ modulator includes an input capacitance connected on an input terminal side of the inverter type integrator, and a feedback capacitance connected between an output terminal and input terminal of the inverter type integrator, and wherein the amplifier includes an input capacitance connected on an input terminal side of the inverter type amplifier, and a feedback capacitance connected between an output terminal and input terminal of the inverter type amplifier.

(6) The solid-state image sensor according to (4), wherein the integrator of the ΔΣ modulator includes an input capacitance connected on an input terminal side of the inverter type integrator, and a feedback capacitance connected between an output terminal and input terminal of the inverter type integrator, and wherein the amplifier includes an input capacitance connected on one of input terminal sides of the differential amplifier, a feedback capacitance connected between an output terminal and one of the input terminals of the differential amplifier, and a reference voltage generation part supplying a reference voltage which is generated using a size ratio equivalent to an element forming the inverter type integrator, to the other input terminal of the differential amplifier.

(7) The solid-state image sensor according to (5) or (6), wherein the amplifier changes a capacitance ratio between the input capacitance and the feedback capacitance, and can set the gain corresponding to an input amplitude of the analog pixel signal.

(8) The solid-state image sensor according to any one of (5) to (7), wherein the amplifier includes a reset switch which resets potentials of the output terminal and input terminal of the amplifier to a predetermined potential.

(9) The solid-state image sensor according to (8), wherein the pixel includes a reset function resetting an electrical charge of floating diffusion, and wherein the reset switch of the amplifier is maintained in a conducting state in parallel with a reset operation of the pixel and resets potentials of the output terminal and input terminal of the amplifier.

(10) The solid-state image sensor according to any one of (1) to (9), wherein the readout unit includes a decimation filter circuit converting the digital signal of the ΔΣ modulator into multiple bits.

(11) A camera system including:

a solid-state image sensor; and an optical system forming a subject image on the solid-state image sensor, wherein the solid-state image sensor includes a pixel array unit in which pixels are arrayed, the pixel including a photodiode converting an optical signal into an electrical signal, and a readout unit which reads out an analog image signal from the pixel to a signal line and processes the read out analog pixel signal in a unit of column, wherein the readout unit includes a ΔΣ modulator which has a function to convert the analog pixel signal in to a digital signal, and an amplifier which is arranged on an input side of the ΔΣ modulator and amplifies the analog pixel signal read out to the signal line using a set gain to input the signal to the ΔΣ modulator.

REFERENCE SIGNS LIST

100 . . . solid-state image sensor, 110 . . . pixel array unit, 110A . . . pixel circuit, 111 . . . photoelectric conversion element, 112 . . . transfer transistor, 113 . . . reset transistor, 114 . . . amplifier transistor, 115 . . . select transistor, 120 . . . row selection circuit (pixel drive part), 130 . . . column readout circuit, 200, 200A . . . column circuit, 210, 210A . . . amplifier, 220, 220A . . . ΔΣ modulator (221, 2211, 2212 . . . integrator, 222 . . . quantizer, 223, 2231, 2232 . . . DAC, 224, 225 . . . adder, 230 . . . decimation filter circuit, 240 . . . ΔΣ AD converter, 300 . . . camera system, 310 . . . imaging device, 320 . . . drive circuit, 330 . . . lens (optical system), 340 . . . the signal processing circuit

The invention claimed is:

1. A solid-state image sensor comprising:

a pixel array unit in which pixels are arrayed, at least a given pixel of the pixels including a photodiode converting an optical signal into an electrical signal; and a readout unit that reads out an analog pixel signal from the given pixel to a signal line and processes the read out analog pixel signal in a unit of column, wherein the readout unit includes a ΔΣ modulator that has a function to convert the analog pixel signal in to a digital signal; and an amplifier that is arranged upstream of the ΔΣ modulator, variably sets its own gain, amplifies the analog pixel signal read out to the signal line using the set gain, and inputs the amplified signal to the ΔΣ modulator, and wherein the amplifier variably sets its own gain based on an input amplitude of the analog pixel signal and performs amplification such that a full-scale input range of the ΔΣ modulator is constant.

2. The solid-state image sensor according to claim 1, wherein the ΔΣ modulator has input part that performs level shift of the pixel signal amplified by the amplifier to input the signal to an integrator, and wherein an amount of the level shift is set as a fixed value.

3. The solid-state image sensor according to claim 1, wherein the ΔΣ modulator is formed as n-dimensional (n is a positive number including 1) modulator, the ΔΣ modulator including at least one integrator having an inverter type integrator;

a quantizer that quantizes an output signal of the integrator as the last stage and outputs a digital signal, and a digital analog converter that converts the digital signal by the quantizer into an analog signal and feeds back on an input side of the integrator, and wherein the amplifier includes an inverter type amplifier or differential amplifier that has the same configuration as the inverter type integrator of the integrator.

4. The solid-state image sensor according to claim 3, wherein the integrator of the ΔΣ modulator includes an input capacitance connected on an input terminal side of the inverter type integrator, and a feedback capacitance connected between an output terminal and input terminal of the inverter type integrator, and wherein the amplifier includes an input capacitance connected on an input terminal side of the inverter type amplifier, and a feedback capacitance connected between an output terminal and input terminal of the inverter type amplifier.

5. The solid-state image sensor according to claim 3, wherein the integrator of the ΔΣ modulator includes an input capacitance connected on an input terminal side of the inverter type integrator, and a feedback capacitance connected between an output terminal and input terminal of the inverter type integrator, and wherein the amplifier includes an input capacitance connected on one of input terminal sides of the differential amplifier, a feedback capacitance connected between an output terminal and one of the input terminals of the differential amplifier, and a reference voltage generation part supplying a reference voltage that is generated using a size ratio equivalent to an element forming the inverter type integrator, to the other input terminal of the differential amplifier.

6. The solid-state image sensor according to claim 4, wherein the amplifier changes a capacitance ratio between the input capacitance and the feedback capacitance, and can set the gain corresponding to an input amplitude of the analog pixel signal.

7. The solid-state image sensor according to claim 4, wherein the amplifier includes a reset switch that resets potentials of the output terminal and input terminal of the amplifier to a predetermined potential.

8. The solid-state image sensor according to claim 7, wherein the pixel includes a reset function resetting an electrical charge of floating diffusion, and wherein the reset switch of the amplifier is maintained in a conducting state in parallel with a reset operation of the pixel and resets potentials of the output terminal and input terminal of the amplifier.

9. The solid-state image sensor according to claim 1, wherein the readout unit includes a decimation filter circuit converting the digital signal of the ΔΣ modulator into multiple bits.

10. A camera system comprising:

the solid-state image sensor according to claim 1; and
an optical system forming a subject image on the solid-state image sensor.

11. The camera system according to claim 10, wherein the ΔΣ modulator has input part that performs level shift of the pixel signal amplified by the amplifier to input the signal to an integrator, and wherein an amount of the level shift is set as a fixed value.

12. The camera system according to claim 10, wherein the ΔΣ modulator is formed as n-dimensional (n is a positive number including 1) modulator, the ΔΣ modulator including at least one integrator having an inverter type integrator;

a quantizer that quantizes an output signal of the integrator as the last stage and outputs a digital signal, and a digital analog converter that converts the digital signal by the quantizer into an analog signal and feeds back on an input side of the integrator, and wherein the amplifier includes an inverter type amplifier or differential amplifier that has the same configuration as the inverter type integrator of the integrator.

13. The camera system according to claim 12, wherein the integrator of the ΔΣ modulator includes an input capacitance connected on an input terminal side of the inverter type integrator, and a feedback capacitance connected between an output terminal and input terminal of the inverter type integrator, and wherein the amplifier includes an input capacitance connected on an input terminal side of the inverter type amplifier, and a feedback capacitance connected between an output terminal and input terminal of the inverter type amplifier.

14. The camera system according to claim 12, wherein the integrator of the ΔΣ modulator includes an input capacitance connected on an input terminal side of the inverter type integrator, and a feedback capacitance connected between an output terminal and input terminal of the inverter type integrator, and wherein the amplifier includes an input capacitance connected on one of input terminal sides of the differential amplifier, a feedback capacitance connected between an output terminal and one of the input terminals of the differential amplifier, and a reference voltage generation part supplying a reference voltage that is generated using a size ratio equivalent to an element forming the inverter type integrator, to the other input terminal of the differential amplifier.

15. The camera system according to claim 13, wherein the amplifier changes a capacitance ratio between the input capacitance and the feedback capacitance, and can set the gain corresponding to input amplitude of the analog pixel signal.

16. The camera system according to claim 13, wherein the amplifier includes a reset switch that resets potentials of the output terminal and input terminal of the amplifier to a predetermined potential.

17. The camera system according to claim 16, wherein the pixel includes a reset function resetting an electrical charge of floating diffusion, and wherein the reset switch of the amplifier is maintained in a conducting state in parallel with a reset operation of the pixel and resets potentials of the output terminal and input terminal of the amplifier.

18. The camera system according to claim 10, wherein the readout unit includes a decimation filter circuit converting the digital signal of the ΔΣ modulator into multiple bits.

* * * * *